United States Patent
Young

[11] Patent Number: 6,059,155
[45] Date of Patent: May 9, 2000

[54] SPARE TIRE MOUNTING ASSEMBLY

[76] Inventor: James O. Young, 1730 Del Norte SW., Albuquerque, Mexico, 87105

[21] Appl. No.: 09/301,739

[22] Filed: Apr. 29, 1999

[51] Int. Cl.[7] .................................................. B62D 43/00
[52] U.S. Cl. .................................. 224/42.12; 224/42.21; 224/42.24; 224/42.26; 224/42.28; 224/42.32; 224/403; 224/502; 224/509
[58] Field of Search .............................. 224/42.21, 42.24, 224/42.26, 42.28, 42.32, 42.12, 42.13, 403, 512, 513, 516, 502, 509

[56] References Cited

U.S. PATENT DOCUMENTS

| | | | |
|---|---|---|---|
| D. 345,337 | 3/1994 | Feller | D12/202 |
| 3,330,455 | 7/1967 | Cooper | 224/42.12 |
| 3,425,605 | 2/1969 | Triboulet | 224/42.12 |
| 3,822,814 | 7/1974 | Baldi | 224/42.12 |
| 4,327,848 | 5/1982 | Weiler | 224/42.12 |
| 4,410,117 | 3/1998 | Crawford et al. | 224/42.12 |
| 5,370,285 | 12/1994 | Steelman | 224/42.21 |
| 5,730,338 | 3/1998 | Travis | 224/42.21 |

*Primary Examiner*—Gregory M. Vidovich
*Assistant Examiner*—Maerena W. Brevard

[57] ABSTRACT

A spare tire mounting assembly for mounting a spare tire to a bumper of a vehicle. The spare tire mounting assembly includes a base plate with a post upwardly extending therefrom. The post has a channel slot therethrough extending downwards from a top end of the post. A threaded elongate tire mounting rod is extended through the elongate channel slot. A pair of threaded nuts are threadably disposed around the tire mounting rod with the post interposed between the nuts. A mounting plate designed for coupling to a bumper of a vehicle is pivotally coupled to the base plate.

6 Claims, 2 Drawing Sheets

SPARE TIRE MOUNTING ASSEMBLY

BACKGROUND OF THE INVENTION

1. Field of the Invention

The present invention relates to spare tire mounting assemblies and more particularly pertains to a new spare tire mounting assembly for mounting a spare tire to a bumper of a vehicle.

2. Description of the Prior Art

The use of spare tire mounting assemblies is known in the prior art. More specifically, spare tire mounting assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,327,848; U.S. Pat. No. 4,410,117; U.S. Pat. No. 3,822,814; U.S. Pat. No. 3,425,605; U.S. Pat. No. 3,330,455; and U.S. Pat. No. Des. 345,337.

While these devices fulfill their respective, particular objectives and requirements, the aforementioned patents do not disclose a new spare tire mounting assembly. The inventive device includes a base plate with a post upwardly extending therefrom. The post has a channel slot therethrough extending downwards from a top end of the post. A threaded elongate tire mounting rod is extended through the elongate channel slot. A pair of threaded nuts are threadably disposed around the tire mounting rod with the post interposed between the nuts. A mounting plate designed for coupling to a bumper of a vehicle is pivotally coupled to the base plate.

In these respects, the spare tire mounting assembly according to the present invention substantially departs from the conventional concepts and designs of the prior art, and in so doing provides an apparatus primarily developed for the purpose of mounting a spare tire to a bumper of a vehicle.

SUMMARY OF THE INVENTION

In view of the foregoing disadvantages inherent in the known types of spare tire mounting assemblies now present in the prior art, the present invention provides a new spare tire mounting assembly construction wherein the same can be utilized for mounting a spare tire to a bumper of a vehicle.

The general purpose of the present invention, which will be described subsequently in greater detail, is to provide a new spare tire mounting assembly apparatus and method which has many of the advantages of the spare tire mounting assemblies mentioned heretofore and many novel features that result in a new spare tire mounting assembly which is not anticipated, rendered obvious, suggested, or even implied by any of the prior art spare tire mounting assemblies, either alone or in any combination thereof.

To attain this, the present invention generally comprises a base plate with a post upwardly extending therefrom. The post has a channel slot therethrough extending downwards from a top end of the post. A threaded elongate tire mounting rod is extended through the elongate channel slot. A pair of threaded nuts are threadably disposed around the tire mounting rod with the post interposed between the nuts. A mounting plate designed for coupling to a bumper of a vehicle is pivotally coupled to the base plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spare tire mounting assembly apparatus and method which has many of the advantages of the spare tire mounting assemblies mentioned heretofore and many novel features that result in a new spare tire mounting assembly which is not anticipated, rendered obvious, suggested, or even implied by any of the prior art spare tire mounting assemblies, either alone or in any combination thereof.

It is another object of the present invention to provide a new spare tire mounting assembly which may be easily and efficiently manufactured and marketed.

It is a further object of the present invention to provide a new spare tire mounting assembly which is of a durable and reliable construction.

An even further object of the present invention is to provide a new spare tire mounting assembly which is susceptible of a low cost of manufacture with regard to both materials and labor, and which accordingly is then susceptible of low prices of sale to the consuming public, thereby making such spare tire mounting assembly economically available to the buying public.

Still yet another object of the present invention is to provide a new spare tire mounting assembly which provides in the apparatuses and methods of the prior art some of the advantages thereof, while simultaneously overcoming some of the disadvantages normally associated therewith.

Still another object of the present invention is to provide a new spare tire mounting assembly for mounting a spare tire to a bumper of a vehicle.

Yet another object of the present invention is to provide a new spare tire mounting assembly which includes a base plate with a post upwardly extending therefrom. The post has a channel slot therethrough extending downwards from a top end of the post. A threaded elongate tire mounting rod is extended through the elongate channel slot. A pair of threaded nuts are threadably disposed around the tire mounting rod with the post interposed between the nuts. A mounting plate designed for coupling to a bumper of a vehicle is pivotally coupled to the base plate.

Still yet another object of the present invention is to provide a new spare tire mounting assembly that may be used on pickup trucks and sports utility vehicles with downwardly pivoting tailgates because the spare tire mounting assembly is also pivotable downwards from a vertical position to a horizontal position. The spare tire mounting assembly lets a user drive the pickup truck or sports utility vehicle with the tailgate down because the spare tire mounting assembly will support a spare tire even when horizontal These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
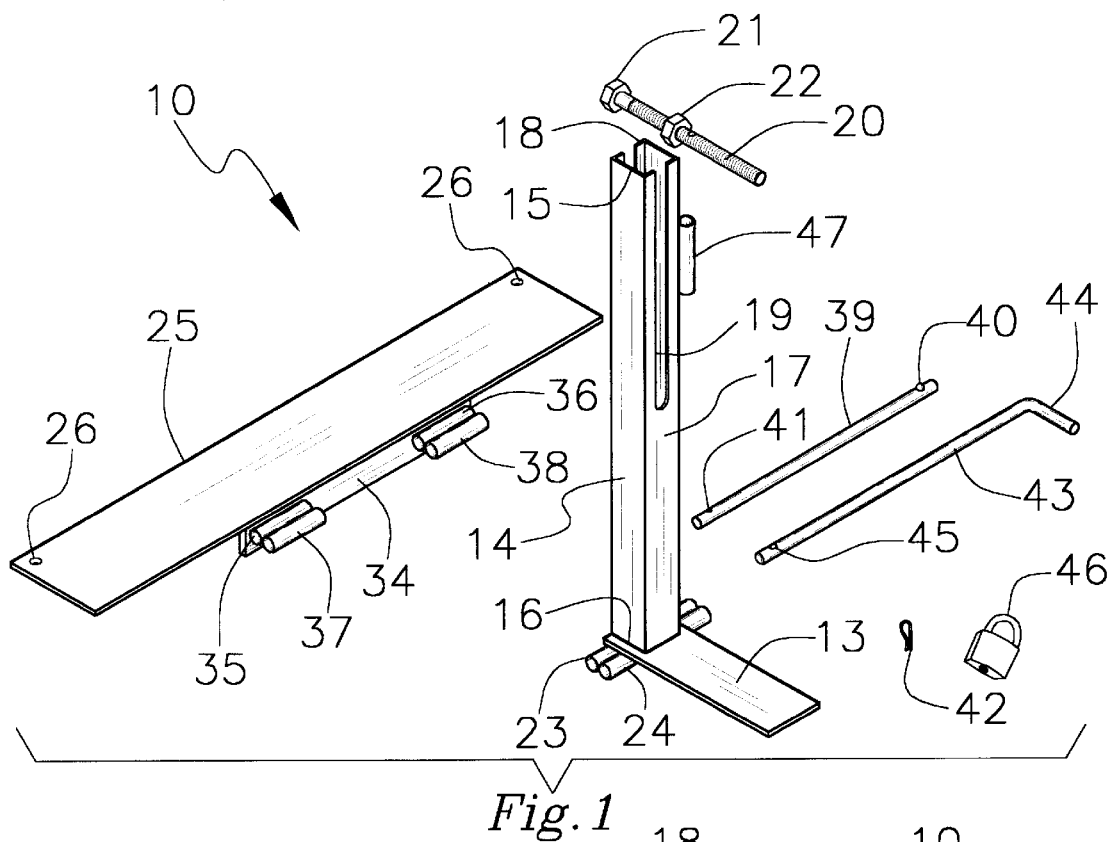
FIG. 1 is a schematic exploded view of a new spare tire mounting assembly according to the present invention.
Figure 2:
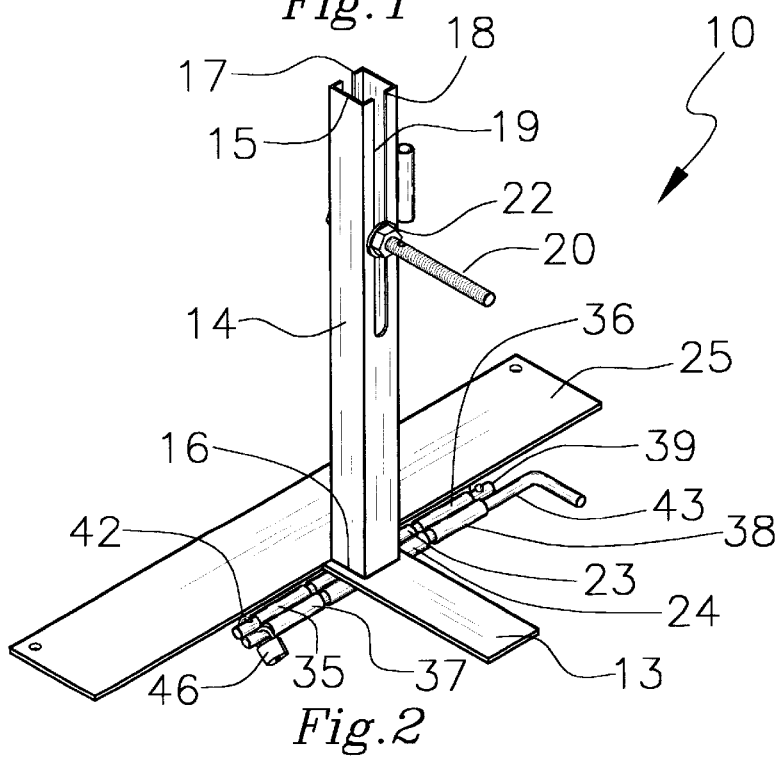
FIG. 2 is a schematic perspective view of the present invention.

With reference now to the drawings, and in particular to FIGS. 1 through 4 thereof, a new spare tire mounting assembly embodying the principles and concepts of the present invention and generally designated by the reference numeral 10 will be described.

As best illustrated in FIGS. 1 through 4, the spare tire mounting assembly 10 generally comprises a base plate with a post upwardly extending therefrom. The post has a channel slot therethrough extending downwards from a top end of the post. A threaded elongate tire mounting rod is extended through the elongate channel slot. A pair of threaded nuts are threadably disposed around the tire mounting rod with the post interposed between the nuts. A mounting plate designed for coupling to a bumper of a vehicle is pivotally coupled to the base plate.

Figure 3:
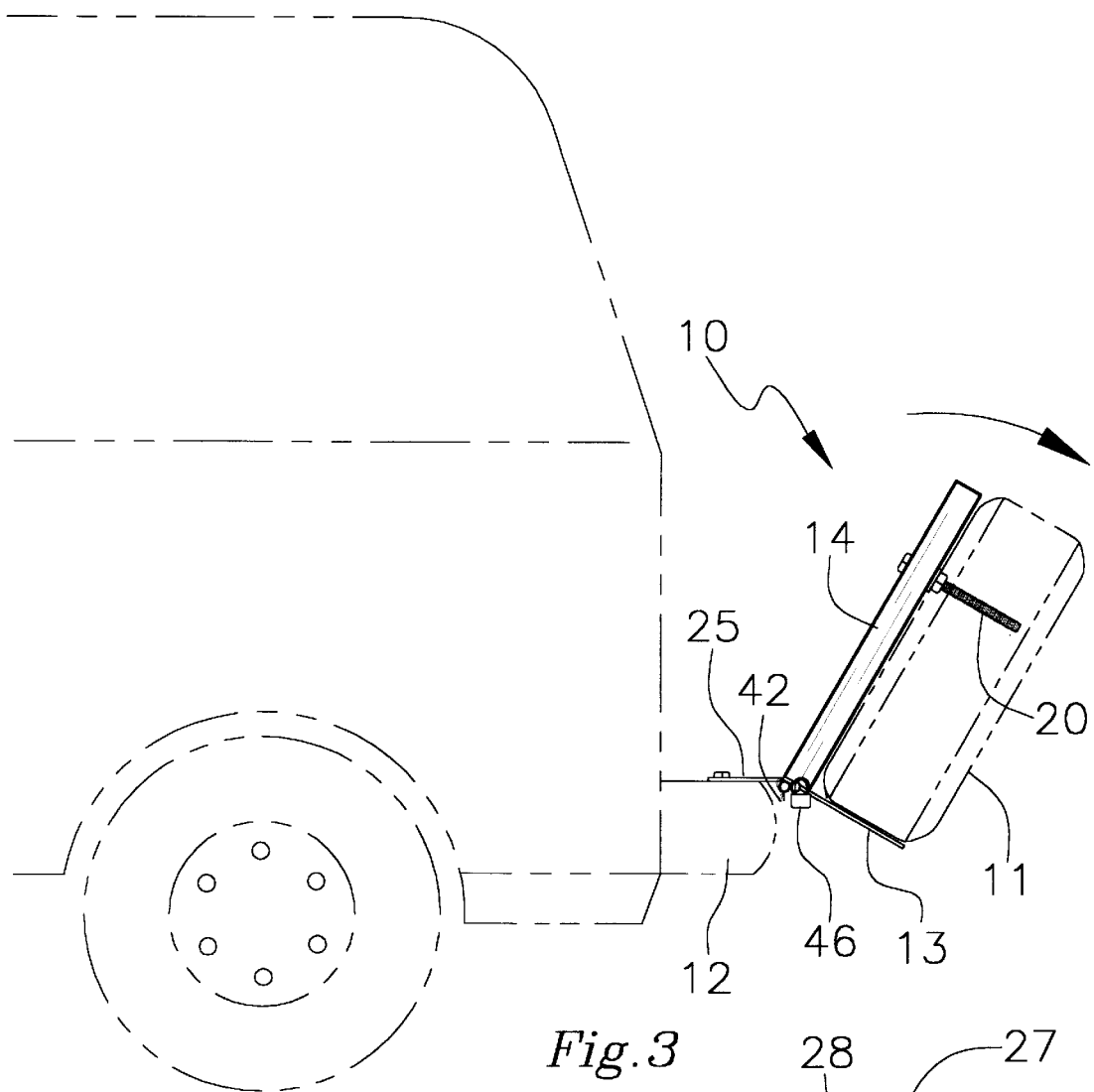
FIG. 3 is a schematic side view of the present invention in use on a vehicle.

In use as illustrated in FIG. 3, the spare tire mounting assembly 10 is designed for mounting a spare tire 11 to a bumper 12 of a vehicle (such as the rear bumper of a pickup truck or sports utility vehicle) typically having a downwardly pivoting tailgate so that the tailgate may still be pivoted downwards when the spare tire mounting assembly is attached to the rear bumper.

In closer detail, the spare tire mounting assembly comprises a generally rectangular planar base plate 13 having a pair of opposite end edges. An elongate post 14 upwardly extends from the base plate. The post has opposite top and bottom ends 15,16, and a longitudinal axis extending between the top and bottom ends of the post. The post preferably has a generally rectangular transverse cross section taken in a plane extending substantially perpendicular to the longitudinal axis of the post such that the post has first and second pairs of sides. The sides 17,18 of the first pair of sides of the post are extended substantially parallel to one another. The sides of the second pair of sides of the post are extended substantially parallel to one another and substantially perpendicular to the first pair of sides of the post.

The bottom end of the post is coupled to the base plate adjacent a first of the end edges of the base plate such that a second of the end edges of the base plate outwardly extends from the post. One of the sides of the first pair of sides of the post is positioned adjacent the first end edge of the base plate. The other of the sides of the first pair of sides of the post is positioned facing towards the second end edge of the base plate. The longitudinal axis of the post is extended substantially perpendicular to the plane in which the base plate lies.

The post has a generally U-shaped elongate channel slot 19 through the first pair of sides and extending downwards from the top end of the post towards the bottom end of the post. Ideally, as illustrated in the Figures, the post is tubular such that the sides of the first pair of sides each have an elongate channel slot which are aligned with one another to form the channel slot of the post.

A threaded elongate tire mounting rod 20 is extended through the elongate channel slot such that an elongate portion of the tire mounting rod outwardly extends in a direction extending away from the first end edge of the base towards the second end edge of the base. The tire mounting rod has a longitudinal axis extending substantially perpendicular to the longitudinal axis of the post. A pair of threaded nuts 21,22 are threadably disposed around the tire mounting rod, the first sides of the post is interposed between the nuts. The nuts are threadably advanced on the tire mounting rod towards one another until the nuts abut the first sides of the post such that the tire mounting rod is held in a fixed position with respect to the post. In use, the tire mounting rod is designed for extending through a mounting hole of a spare tire of a vehicle such that a center portion of the spare tire is positioned between the post and one of the nuts to hold the spare tire on the tire mounting rod. As best illustrated in FIG. 3, the base plate is designed for resting a portion of a tread of the spare tire thereon when the spare tire is mounted on the tire mounting rod.

The base plate has an adjacent pair of substantially parallel open ended hinge tubes 23,24 coupled thereto adjacent the first end edge of the base plate and below the bottom end of the post.

Figure 4:
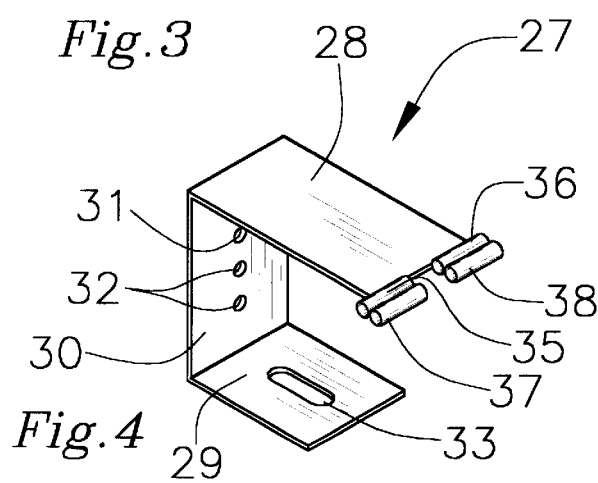
FIG. 4 is a schematic perspective view of the second mounting plate.

A generally rectangular mounting plate 25 is also provided having a pair of opposite shorter ends and a pair of longer sides extending between the ends of the mounting plate. The mounting plate has 26 a pair of holes for extending fasteners therethrough to couple the mounting plate to a bumper of a vehicle. Optionally, as illustrated in FIG. 4, a second mounting plate 27 may be provided instead. This second mounting plate has spaced apart top and bottom plates 28,29 and a back plate 30 connecting the top and bottom plates together. The back plate has a pair of bumper holes 31 and a license plate hole 32. The bottom plate has an oblong mounting hole 33.

A generally rectangular side plate 34 is coupled to one of the sides of the mounting plate and downwardly depending from the mounting plate. The side plate has spaced apart first and second adjacent pairs of substantially parallel open ended hinge tubes 35,36,37,38 are coupled thereto. In the embodiment with the second mounting plate, these hinge tubes are directly coupled to a free edge of the top plate. In either embodiment, each hinge tube of one pair the first pair of hinge tubes of the side plate is coaxially aligned with a corresponding hinge tube of the second pair of hinge tubes of the side plate.

The hinge tubes of the base plate are interposed between the first and second pairs of the hinge tubes of the side plate. One of the hinge tubes of the base plate is coaxially aligned with one set of coaxially aligned corresponding hinge tubes of the side plate and the other of the hinge tubes of the base plate is coaxially aligned with the other set of coaxially aligned corresponding hinge tubes of the side plate.

An elongate hinge rod 39 is extended through the one set of coaxially aligned corresponding hinge tubes and the associated hinge tube of the base plate to pivotally couple the side plate of the mounting plate to the first edge of the base plate. The hinge rod has a pair of opposite ends with the one set of one set of coaxially aligned corresponding hinge tubes and the associated hinge tube of the base plate is interposed between the ends of the hinge rod. One of the ends of the hinge rod has an end extent 40 to prevent sliding of one end of the hinge rod through the one set of coaxially aligned corresponding hinge tubes and the associated hinge tube of the base plate. The other of the ends of the hinge rod has a transverse bore 41 therethrough designed for extending a cotter pin 42 therethrough for preventing sliding of the other end of the hinge rod through the one set of coaxially aligned corresponding hinge tubes and the associated hinge tube of the base plate.

An elongate release rod 43 is extended through the other set of coaxially aligned corresponding hinge tubes and the associated hinge tube of the base plate to hold base plate in a fixed position with respect to the mounting plate. The release rod has a pair of opposite ends with the other set of coaxially aligned corresponding hinge tubes and the associated hinge tube of the base plate interposed between the ends of the release rod. One of the ends of the release rod has a handle extent 44 extending substantially perpendicular to the release rod. The other of the ends of the release rod has a transverse bore 45 therethrough designed for extending a bolt of a padlock 46 therethrough for preventing unauthorized sliding of the other end of the release rod through the other set of coaxially aligned corresponding hinge tubes and the associated hinge tube of the base plate.

Preferably, a holding tube 47 is coupled to the post for inserting the release handle when the release handle is removed from the other set of aligned hinge tubes to permit pivoting of the base plate and post with respect to the mounting plate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A spare tire mounting assembly for mounting a spare tire to a bumper of a vehicle, said spare tire mounting assembly comprising:

a base plate;

a post upwardly extending from said base plate, said post having opposite top and bottom ends, and a longitudinal axis extending between said top and bottom ends of said post;

said post having a channel slot therethrough extending downwards from said top end of said post towards said bottom end of said post;

a threaded elongate tire mounting rod being extended through said elongate channel slot;

a pair of threaded nuts being threadably disposed around said tire mounting rod, said post being interposed between said nuts; and a mounting plate adapted for coupling to a bumper of a vehicle, said mounting plate being pivotally coupled to said base plate.

2. The spare tire mounting assembly of claim 1, wherein said post has a generally rectangular transverse cross section taken in a plane extending substantially perpendicular to said longitudinal axis of said post such that said post has first and second pairs of sides, wherein channel slot is extended through said first pair of sides and extending downwards from said top end of said post towards said bottom end of said post.

3. The spare tire mounting assembly of claim 1, wherein said base plate has an adjacent pair of substantially parallel hinge tubes coupled thereto, wherein said mounting plate has spaced apart first and second adjacent pairs of substantially parallel hinge tubes being coupled thereto, wherein said hinge tubes of said base plate are interposed between said first and second pairs of said hinge tubes of said side plate, wherein a hinge rod is extended through one set of aligned hinge tubes of said base plate and mounting plate to pivotally coupled said base plate and said mounting plate together.

4. The spare tire mounting assembly of claim 3, wherein a release rod is extended through another set of aligned hinge tubes of the mounting plate and the base plate to hold base plate in a fixed position with respect to said mounting plate.

5. The spare tire mounting assembly of claim 5, wherein said release rod has a handle extent at one end extending substantially perpendicular to said release rod.

6. A spare tire mounting assembly for mounting a spare tire to a bumper of a vehicle, said spare tire mounting assembly comprising:

a generally rectangular planar base plate having a pair of opposite end edges;

an elongate post upwardly extending from said base plate, said post having opposite top and bottom ends, and a longitudinal axis extending between said top and bottom ends of said post;

said post having a generally rectangular transverse cross section taken in a plane extending substantially perpendicular to said longitudinal axis of said post such that said post has first and second pairs of sides;

said first pair of sides of said post being extended substantially parallel to one another, said second pair of sides of said post being extended substantially parallel to one another and substantially perpendicular to said first pair of sides of said post;

said bottom end of said post being coupled to said base plate adjacent a first of said end edges of said base plate such that a second of said end edges of said base plate outwardly extends from said post;

one of said sides of said first pair of sides of said post being positioned adjacent said first end edge of said base plate, the other of said sides of said first pair of sides of said post being positioned facing towards said second end edge of said base plate;

said longitudinal axis of said post being extended substantially perpendicular to said base plate;

said post having a generally U-shaped elongate channel slot through said first pair of sides and extending downwards from said top end of said post towards said bottom end of said post;

wherein said post is tubular such that said sides of said first pair of sides each have a elongate channel slot, said channel slots of said first sides of said post being aligned with one another;

a threaded elongate tire mounting rod being extended through said elongate channel slot such that an elongate portion of said tire mounting rod outwardly extends in a direction extending away from said first end edge of said base towards said second end edge of said base;

said tire mounting rod having a longitudinal axis extending substantially perpendicular to said longitudinal axis of said post;

a pair of threaded nuts being threadably disposed around said tire mounting rod, said first sides of said post being interposed between said nuts, said nuts being threadably advanced on said tire mounting rod towards one another until said nuts abut said first sides of said post such that said tire mounting rod is held in a fixed position with respect to said post;

said tire mounting rod being adapted for extending through a mounting hole of a spare tire of a vehicle such that a center portion of the spare tire is positioned between said post and one of said nuts to hold the spare tire on said tire mounting rod;

said base plate being adapted for resting a portion of a tread of the spare tire thereon when the spare tire is mounted on the tire mounting rod;

said base plate having an adjacent pair of substantially parallel hinge tubes coupled thereto adjacent said first end edge of said base plate and below said bottom end of said post;

a generally rectangular mounting plate having a pair of opposite ends and a pair of sides extending between said ends of said mounting plate;

said mounting plate having a pair of holes for extending fasteners therethrough to couple said mounting plate to a bumper of a vehicle;

a generally rectangular side plate being coupled to one of said sides of said mounting plate and downwardly depending from said mounting plate;

said side plate having spaced apart first and second adjacent pairs of substantially parallel hinge tubes being coupled thereto, each hinge tube of one pair said first pair of hinge tubes of said side plate being coaxially aligned with a corresponding hinge tube of said second pair of hinge tubes of said side plate;

said hinge tubes of said base plate being interposed between said first and second pairs of said hinge tubes of said side plate;

one of said hinge tubes of said base plate being coaxially aligned with one set of coaxially aligned corresponding hinge tubes of said side plate and the other of said hinge tubes of said base plate being coaxially aligned with the other set of coaxially aligned corresponding hinge tubes of said side plate;

an elongate hinge rod being extended through the one set of coaxially aligned corresponding hinge tubes and the associated hinge tube of said base plate to pivotally couple said side plate of said mounting plate to said first edge of said base plate;

said hinge rod having a pair of opposite ends, the one set of one set of coaxially aligned corresponding hinge tubes and the associated hinge tube of said base plate being interposed between said ends of said hinge rod;

one of said ends of said hinge rod having an end extent to prevent sliding of one end of said hinge rod through said the one set of coaxially aligned corresponding hinge tubes and the associated hinge tube of said base plate;

the other of said ends of said hinge rod having a transverse bore therethrough adapted for extending a cotter pin therethrough for preventing sliding of said other end of said hinge rod through said one set of coaxially aligned corresponding hinge tubes and the associated hinge tube of said base plate;

an elongate release rod being extended through the other set of coaxially aligned corresponding hinge tubes and the associated hinge tube of said base plate to hold base plate in a fixed position with respect to said mounting plate;

said release rod having a pair of opposite ends, the other set of one set of coaxially aligned corresponding hinge tubes and the associated hinge tube of said base plate being interposed between said ends of said release rod;

one of said ends of said release rod having a handle extent extending substantially perpendicular to said release rod; and the other of said ends of said release rod having a transverse bore therethrough adapted for extending a bolt of a padlock therethrough for preventing unauthorized sliding of said other end of said release rod through said other set of coaxially aligned corresponding hinge tubes and the associated hinge tube of said base plate.

* * * * *